United States Patent
Spörl et al.

(10) Patent No.: US 6,469,523 B2
(45) Date of Patent: Oct. 22, 2002

(54) TEMPERATURE COMPENSATION IN THE CONTEXT OF CAPACITIVE DISTANCE MEASUREMENT WITH THE AID OF AN LC OSCILLATOR

(75) Inventors: Georg Spörl, Rheinstetten; Stephan Biermann, Gemsbach, both of (DE)

(73) Assignee: Precitec KG, Gaggenau-Bad Rotenfels (DE)

( * ) Notice: Subject to any disclaimer, the term of this patent is extended or adjusted under 35 U.S.C. 154(b) by 0 days.

(21) Appl. No.: 09/783,093

(22) Filed: Feb. 15, 2001

(65) Prior Publication Data

US 2001/0024126 A1 Sep. 27, 2001

(30) Foreign Application Priority Data

Feb. 15, 2000 (DE) .......................................... 100 06 691

(51) Int. Cl.[7] ............................................... G01R 27/26
(52) U.S. Cl. ........................................................ 324/685
(58) Field of Search ................................. 324/658, 661, 324/662, 684, 685; 73/862.337; 340/870.37; 331/44, 65, 117 R; 82/1.11, 142, 900

(56) References Cited

U.S. PATENT DOCUMENTS

| 5,293,137 A | | 3/1994 | Tavis et al. | |
|---|---|---|---|---|
| 5,303,458 A | * | 4/1994 | Sheehan et al. | ............... 29/405 |
| 5,623,857 A | * | 4/1997 | Sakaraba | ..................... 82/1.11 |
| 6,340,875 B1 | * | 1/2002 | Watanabe et al. | ...... 318/568.11 |

FOREIGN PATENT DOCUMENTS

| DE | 3536630 | 4/1986 |
|---|---|---|
| DE | 3825974 | 2/1989 |
| DE | 4332439 | 9/1993 |
| DE | 9419477 | 5/1994 |
| DE | 19642699 A1 | 4/1998 |
| DE | 19847365 | 10/1998 |
| EP | 0303563 | 2/1989 |

* cited by examiner

Primary Examiner—N. Le
Assistant Examiner—Eitenne P LeRoux
(74) Attorney, Agent, or Firm—Birch, Stewart, Kolasch & Birch, LLP

(57) ABSTRACT

The invention relates to a method for temperature compensation of an LC oscillator (8) having a machining head (4) and serving for the capacitive measurement of a distance between the machining head (4) and a workpiece (7), in which an output signal (S) of the LC oscillator (8) is transmitted to an evaluation unit (2) arranged separately from the machining head (4). The temperature (T) of the LC oscillator (8) is measured with the aid of the temperature sensor (29) and supplied to the evaluation unit (2). In the evaluation unit (2), temperature compensation of the output signal (S) of the LC oscillator (8) is effected using the measured temperature (T) and a temperature coefficient (K) which is assigned to the machining head (4) and can likewise be transmitted from the machining head (4) to the evaluation unit (2).

20 Claims, 2 Drawing Sheets

Temp. sensor 29

Monostable multivibrator 38

TEMPERATURE COMPENSATION IN THE CONTEXT OF CAPACITIVE DISTANCE MEASUREMENT WITH THE AID OF AN LC OSCILLATOR

BACKGROUND OF THE INVENTION

1. Field of the Invention

The invention relates to a method for temperature compensation of an LC oscillator having a machining head and serving for the capacitive measurement of a distance between the machining head and a workpiece, in which an output signal of the LC oscillator is transmitted to an evaluation unit arranged separately from the machining head. Further, the invention relates to a machining head and also to an associated evaluation unit for carrying out the method.

2. Description of the Related Art

It is already generally known for the distance between a workpiece and a machining head for machining the workpiece to be measured capacitively, to be precise using a sensor electrode which is electrically conductively connected to the machining head and yields a sensor signal which corresponds to the distance and whose magnitude depends on the capacitance between sensor electrode and workpiece.

By monitoring the sensor signal, it is possible to position the machining head relative to the workpiece in order to be able to machine the workpiece in a suitable manner. In this case, the positioning is effected by means of a regulating device which receives the measured distance as actual value and controls the position of the sensor electrode or the machining head in a manner dependent on a comparison of the actual value with a predetermined desired value.

The machining head may be a laser cutting nozzle, for example, from which a laser beam emerges for machining the workpiece. With the aid of the laser beam, welding work, cutting work, etc, can be carried out on the workpiece.

However, previously known systems in which an LC oscillator is used for capacitive distance measurement, and one of which is disclosed e.g. in German patent application 198 47 365.6, have a temperature drift originating from the temperature coefficient of the coils used. This temperature drift has the effect of corrupting the measured distance between machining head and workpiece and is essentially caused by the fact that the components of the LC oscillator are heated by the welding or cutting process taking place not very far away.

In order to be able at least partially to eliminate this temperature drift, it has already been conceived of to insert additional capacitors into the resonant circuit of the LC oscillator in order to be able to compensate the temperature drift of the coils by the temperature coefficient of the capacitors. However, this has the disadvantage that the additional capacitors are in parallel with the measuring capacitor formed from sensor electrode and workpiece, and thus reduce the measurement sensitivity. A further disadvantage is that the variation of the temperature coefficients of individual components cannot be taken into account and the matching of the oscillator circuit during development is very time-consuming.

BRIEF SUMMARY OF THE INVENTION

The invention is based on the object of providing a further method for the temperature compensation described, which can be performed more simply and more accurately. Furthermore, the intention is to provide a machining head which is suitable for carrying out the method, and also an evaluation unit suitable therefor, to which the processing head can be connected.

A method according to the invention for temperature compensation of an LC oscillator having a machining head is distinguished by the fact that the temperature of the LC oscillator is measured with the aid of a temperature sensor, that the temperature is transmitted to the evaluation unit, and that, in the evaluation unit, temperature compensation of the output signal of the LC oscillator is effected using the measured temperature and a temperature coefficient assigned to the machining head.

According to the invention, then, the temperature drift of the resonant circuit of the LC oscillator is no longer compensated at the resonant circuit itself, rather the temperature is transmitted to the evaluation unit so that the temperature compensation can be performed there. Accordingly, there is also no longer a need to insert into the LC generator additional components whose temperature coefficient itself cannot be taken into account and which would only lead to a reduction in the measurement sensitivity of the system. The method according to the invention thus leads to more accurate results and can be carried out more simply.

The temperature coefficient which is required for temperature compensation and is assigned to a respective machining head can be recorded empirically after the production of the machining head and be stored at a suitable location. If the evaluation unit knows what machining head is involved, then the temperature coefficient assigned to the machining head can be stored e.g. in the evaluation unit and be retrieved by the latter as required. However, for the sake of simpler handling, after the production of the respective machining head, the associated temperature coefficient of the LC oscillator can also be stored in a storage device which is connected to the machining head itself. Consequently, the assignment between machining head and temperature coefficient is always unambiguous and can lead to more reliable temperature compensation. If the temperature coefficient is required for compensation purposes, then it can be transmitted to the evaluation unit in a suitable way, to be precise together with the temperature measured by the temperature sensor, or the corresponding measured temperature value. The temperature coefficient may be stored e.g. in a nonvolatile memory. The transmission of the measured temperature value to the evaluation unit and, if appropriate, the transmission of the temperature coefficient to the evaluation unit may be carried out periodically or at predetermined time intervals.

According to a highly advantageous refinement of the invention, the transmission of the measured temperature (the measured temperature value) and/or of the stored temperature coefficient to the evaluation unit is effected digitally, since this enables the transmission to be carried out very accurately. For this purpose, the data format of the digital transmission may be a serial bit stream containing, in coded form, the measured temperature value and, if appropriate, the temperature coefficient. The customary checking methods for ascertaining entirely satisfactory data transmission from the machining head to the evaluation unit can then be applied to it, if necessary. However, for the digital transmission of measured temperature value and, if appropriate, the temperature coefficient, a square-wave voltage may also be used whose frequency is proportional to the measured temperature and whose pulse duration is proportional to the temperature coefficients. In such a case, the transmission device can be constructed relatively simply, for instance using a monostable multivibrator.

According to a further, highly advantageous refinement of the invention, at least the output signal of the LC oscillator and the measured temperature, but also, if appropriate, the temperature coefficient, are transmitted from the machining head to the evaluation unit via the same line, which results in a particularly simple connection between machining head and evaluation unit. For this connection, it is suitable to use a coaxial cable. In this case, the transmission of the measured temperature and/or of the temperature coefficient can be effected digitally in a different frequency range from that of the output signal of the LC oscillator, in order to avoid interference between the two signal groups.

In a development of the invention, the digitization may be effected by modulation of the current demand of a circuit which is present in a manner pertaining to the machining head and contains the temperature sensor, the modulated current demand being monitored in the evaluation unit. From the modulated current demand, the evaluation unit can thus draw conclusions about the measured temperature and/or about the temperature coefficient in order then to use these values as a basis for further machining.

A machining head having an LC oscillator formed partly by it and serving for the capacitive measurement of a distance between the machining head and a workpiece to be machined, in which an output signal of the LC oscillator can be transmitted to an evaluation unit separate from the machining head, is distinguished by the fact that it has at least one temperature sensor for measuring the temperature of the LC oscillator, and that the measured temperature can be transmitted to the evaluation unit. In this case, it may also have a storage device for storing a temperature coefficient which is provided for it and can likewise be transmitted to the evaluation unit.

For digitization and thus reliable transmission of the measured temperature and/or of the temperature coefficient, use is made of a digitization circuit which is present on the machining head and can be supplied via a cable with a supply voltage from the evaluation unit, the digitization, for the sake of simplicity, being effected by modulation of the current demand of the digitization circuit. In this case, the modulation of the current demand of the digitization circuit can be carried out by connecting a resistor to the supply voltage. The evaluation unit is then designed in such a way that it has a current measuring device for measuring the supply current of the machining head, and a comparison circuit connected downstream of the current measuring device. By comparing the measured current values of the supply current with a reference current value provided by the comparison circuit, it is thus possible to reproduce the binary data for the transmitting measured temperature value and/or the transmitting temperature coefficient in the evaluation unit, and from this then the corresponding actual values in order then to correct the measured distance signal (frequency signal) in correspondence with the measured temperature value and the temperature coefficient. This can be done in a microprocessor of the evaluation unit, which on the one hand is connected to the output of the comparison circuit and on the other hand receives the output signal of the LC oscillator via a high-pass filter.

It shall also be pointed out that all data are preferably transmitted via the inner conductor of a coaxial cable from the machining head to the evaluation unit, and that the machining head can be designed in any desired way. For instance, it may be a laser machining head, through which, therefore, a laser beam passes which is used for carrying out welding or cutting work, or, alternatively, it may be in a machining head in which, for instance, only a machining gas emerges.

BRIEF DESCRIPTION OF THE DRAWINGS

Exemplary embodiments of the invention are explained in detail below with reference to the drawing, in which.

DETAILED DESCRIPTION OF THE INVENTION

Figure 1:
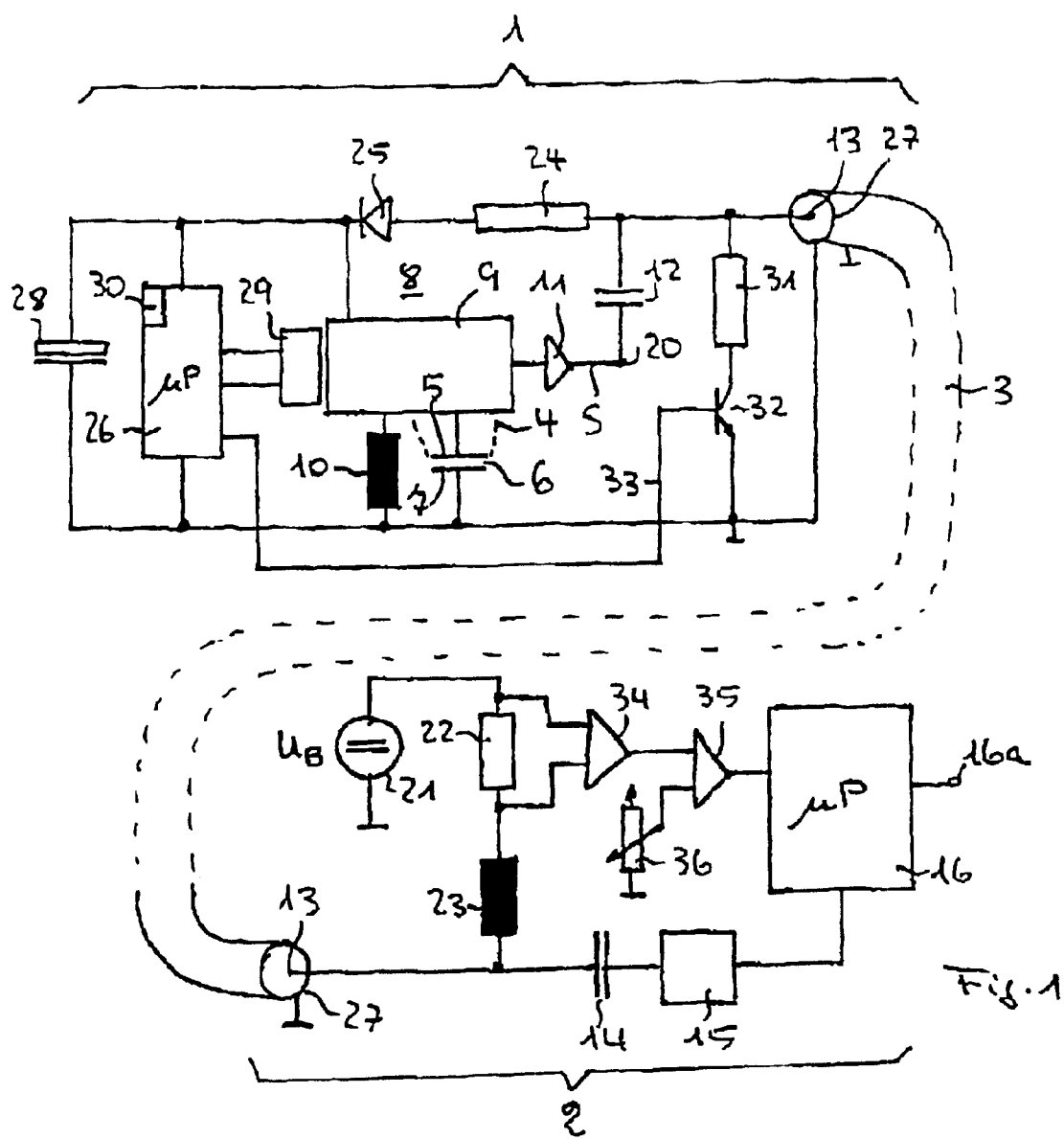
FIG. 1 shows a machining device comprising laser machinging head and evaluation unit.

FIG. 1 shows a circuit arrangement for the operational control of a machining head, which may be designed e.g. as a laser machining head. This circuit arrangement comprises a circuit section 1, arranged directly on the laser machining head, and an evaluation unit 2, which is arranged separately from the laser machining head and is connected to the circuit section 1 via a coaxial cable 3.

The laser machining head bears the reference symbol 4 and is indicated only by broken lines in FIG. 1. It belongs to the circuit section 1, where it forms a first electrode 5 of a measuring capacitor 6, whose second electrode 7 is formed by a workpiece which is to be machined with the aid of the laser machining head 4. The laser machining head 4 is designed in a known manner for instance in nozzle form, a laser beam travelling through it in the longitudinal direction of the nozzle in order to carry out e.g. welding or cutting work on the workpiece. Suitable gas may also flow through the nozzle for this purpose.

During the machining of the workpiece, the distance between the laser machining head 4 and the workpiece must usually remain constant, that is to say the distance between the first electrode 5 and the second electrode 7. This distance is measured capacitively with the aid of the circuit arrangement according to FIG. 1. For this purpose, a distance measurement signal S is generated, whose frequency depends on the capacitance of the measuring capacitor 6. The distance measurement signal S is transmitted via the coaxial cable 3 to the evaluation unit 2 and forms practically an actual value. This actual value is compared with a predetermined desired value, and a regulating device then regulates the measured actual value to the desired value in order to maintain a distance corresponding to the desired value between the electrodes 5 and 7. The corresponding actuating device for adjusting the height position of the laser machining head 4 relative to the workpiece is not illustrated in FIG. 1, for the sake of clarity.

The distance measurement signal S is the output signal of an LC oscillator 8, which includes a control part 9, a coil 10, the measuring capacitor 6 and an output amplifier 11. More precisely, what is of interest here as output signal is the frequency of the distance measurement signal S, which, having been filtered via a capacitor 12, is fed as high-frequency signal via an inner conductor 13 of the coaxial cable 3 and a further high-pass filter 14 to a frequency counter 15 in the evaluation unit. The frequency counted by the frequency counter 15 is then forwarded to a microprocessor 16, which regards this frequency value, after temperature correction that is yet to be described, as an actual value.

Figure 5:
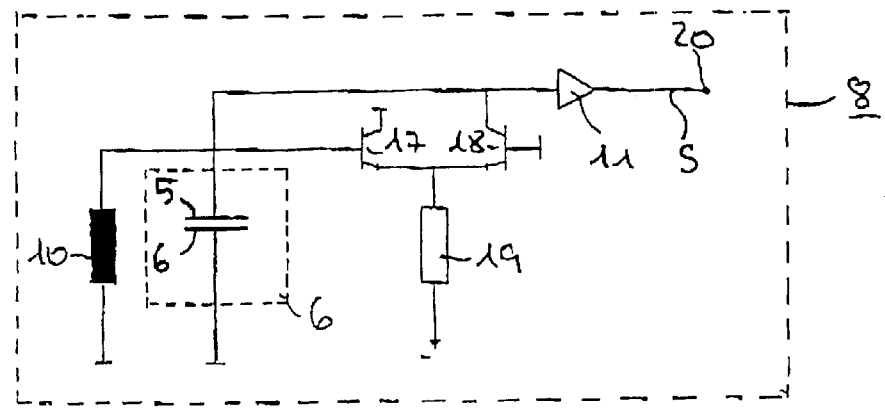
FIG. 5 shows an exemplary structure of an LC oscillator.

The LC oscillator 8 shown in FIG. 1 may have a structure in accordance with FIG. 5. Accordingly, the LC oscillator 8 contains, in the control part 9, a first transistor 17, a second transistor 18 and an emitter resistor 19. The collector terminal of the first transistor 17 is earthed, while its base terminal is coupled to the coil 10 and the first electrode 5 of the measuring capacitor 6. This base terminal also passes to the input of the output amplifier 11. The other terminals of coil 10 and measuring capacitor 6 are earthed, that is to say including the second electrode 7 or the workpiece. The control part 9 furthermore contains a second transistor 18, whose base terminal is earthed and whose collector terminal is likewise connected to the input of the output amplifier 11. The emitter terminals of the two transistors 17 and 18 are directly connected to one another, an emitter resistor 19 in each case being coupled to the emitter terminals of the transistors 17 and 18 via a common junction point. The other terminal of the emitter resistor 19 contains negative supply potential. The output of the output amplifier 11 is passed to an output node 20, which can also be seen in FIG. 1.

The LC oscillator 8 shown in FIGS. 1 and 5 is realized as a differential amplifier. Since the base potential of the first transistor 17 is in phase with the collector potential of the second transistor 18, the positive feedback can be produced by direct connection. The loop gain is proportional to the transconductance of the transistors. It can be set within wide limits by changing the emitter current. The distance measurement signal S, whose frequency is determined by the distance-dependent capacitance 6, is then obtained at the output 20 of the LC oscillator 8.

For the DC voltage supply of the circuit section 1 or of the LC oscillator 8, use is made of a DC voltage source 21 which is present in the evaluation unit 2 and serves for supplying a supply voltage $U_B$. One of its terminals is earthed, while its other terminal is connected to the inner conductor 13 of the coaxial cable 3 via a resistor 22 and a coil 23 in the evaluation unit 2. In this case, the coil 23 is connected to the inner conductor 13 in the region between the coaxial cable 3 and the high-pass filter 14. In the circuit section 1, the centre conductor 13 of the coaxial cable 3 is connected to one electrode of the capacitor 12, whose other electrode is connected to the output node 20, and is furthermore connected via a resistor 24 to the anode of a rectifier diode 25, whose cathode is connected to the control part 9 of the LC oscillator 8. In this way, a DC supply voltage passes via the resistor 24 and the rectifier diode 25 to the control part 9. The negative DC voltage can be derived from this DC supply voltage in the control part 9, to which negative DC voltage the emitter resistor 19 is to be connected in accordance with FIG. 5.

A microprocessor 26 is connected between the cathode of the rectifier diode 25 and earth. Its earth terminal is connected to the earthed screening conductor 27 of the coaxial cable 3, to which the earth terminal of the coil 10 and the second electrode 7 of the measuring capacitor 6 are also connected. In parallel with the microprocessor 26 there is an energy storage device 28, for instance an electrolytic capacitor, in order to be able to compensate for voltage dips.

The microprocessor 26 is electrically connected to a temperature sensor 29, the temperature sensor 29 preferably being located on the same circuit board on which the LC oscillator 8 is also situated, in order to be able to measure the temperature thereof as exactly as possible. The temperature measured by the temperature sensor 29 is converted into a digital value, and if appropriate buffer-stored, in the microprocessor 26. Furthermore, a temperature coefficient is stored in a storage section 30 of the microprocessor 26, which coefficient is fixedly assigned to the laser machining head 4 connected to the LC oscillator 8. After the production of the laser machining head 4 and the fitting of the circuit section 1 to the laser machining head 4, this temperature coefficient is determined empirically and stored in the storage section 30. The temperature measured by the temperature sensor 29 and the temperature coefficient stored in the storage section 30 can then be transmitted periodically and in digital form from the microprocessor 26 to the evaluation unit 2 during the operation of the laser machining head 4, in order that temperature compensation of the frequency count which has been determined by the frequency counter 15 can be effected in the microprocessor 16 in the said evaluation unit. In this case, the measured temperature value and the temperature coefficient are likewise transmitted via the inner conductor 13 of the coaxial cable 3, via which the high-frequency distance measurement signal S is also transmitted. However, the distance measurement signal is transmitted in a significantly higher frequency range than the temperature measurement signal and the temperature coefficient. Furthermore, the distance measurement signal S can be evaluated in milliseconds, while the temperature measurement signal and the temperature coefficient can be evaluated in seconds.

In order to be able to transmit the measured temperature value and the temperature coefficient via the inner conductor 13 of the coaxial cable 3 to the evaluation unit 2, e.g. modulation of the current demand of the circuit section 1 may be effected, to be precise by connecting a resistor 31 to the supply voltage of the circuit section 1. One terminal of the resistor 31 is connected to the inner conductor 13 and the other terminal is connected to the collector of a transistor 32, whose emitter is earthed. The base terminal of the transistor 32 is connected via a line 33 to a switching output of the microprocessor 26. In accordance with the digital values of the measured temperature and of the temperature coefficients, the microprocessor 26 activates the transistor 32 via the line 33 and thus loads the supply voltage, so that a higher current is drawn from the DC voltage supply 21. This current demand is monitored in the evaluation unit 2, in such a way that a current measurement is effected by means of a differential amplifier 34 across the resistor 22. The two ends of the measuring resistor 22 are thus connected to different inputs of the differential amplifier 34, whose output is connected to one input of a further differential amplifier 35, which operates as a comparator and to whose other input a comparison value can be applied which is obtained via a centre tap of a resistor 36 connected between earth and supply potential. As a result of the monitoring of the current demand carried out by the evaluation unit 2, a digital signal is then obtained at the output of the second differential amplifier 35 (e.g. low operating current corresponding to a logic 0, higher operating current corresponding to a logic 1), which signal corresponds to the digital values of measured temperature and temperature coefficients output by the microprocessor 26. Consequently, the measured temperature and the temperature coefficient are available to the microprocessor 16, so that it can then perform temperature compensation of the frequency value of the distance measurement signal S, the said frequency value being determined by the frequency counter 15. In other words, the actual value is then corrected in the microprocessor 16. An actuating signal for distance adjustment, which signal is obtained by the comparison of the actual value with the desired value, is output via an output 16a of the microprocessor 16.

If, by way of example, it is stipulated for the laser machining head 4 that, at a frequency of the distance measurement signal S of 10 MHz and a room temperature of 20° C., the distance between the first electrode 5 and the second electrode 7 should be exactly 1 mm, and if the laser machining head has a temperature coefficient $\Delta f/\Delta T = K = 2$ kHz/° C., then a $\Delta T$ of 30° C. would result at an actual operating temperature T of 50° C. This leads to a correction value with regard to the frequency of 60 kHz. Therefore, at 50° C. and given a distance of 1 mm between the electrodes 5 and 7, the frequency of the distance measurement signal S would initially be set to 10.06 MHz, which would be incorrect. However, since the actual temperature T=50° C. and the temperature coefficient K=2 kHz/° C. have been communicated to the microprocessor 16 by the microprocessor 26, the former can correct the frequency of the distance measurement signal S by 60 kHz to 10.0 MHz, so that the system can regulate to the distance of 1 mm again even at a temperature of T=50° C.

Figure 2:
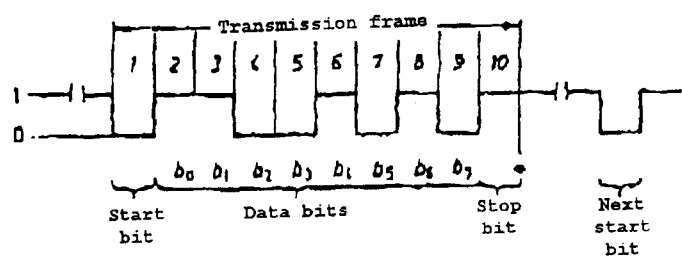
FIG. 2 shows a data format for the digital transmission of a serial bit stream from the machining head to the evaluation unit.

For the digital transmission of the measured temperature value and of the temperature coefficient from the circuit section 1 to the evaluation unit 2, it is possible to choose a transmission frame as is shown in FIG. 2. This transmission frame has a start bit and a stop bit and intervening data bits which are reserved for the measured temperature and the temperature coefficient. These data bits are compiled in a suitable manner by the microprocessor 26.

Figure 3:
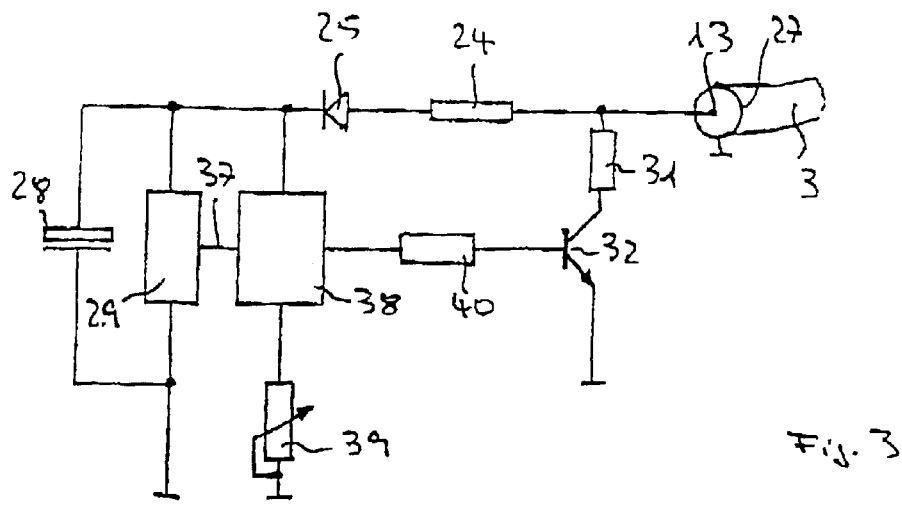
FIG. 3 shows a further circuit present on the machining head and serving for modulation of its supply current.

FIG. 3 shows a particularly simple embodiment of temperature detection at the machining head 4. Identical elements to those in FIG. 1 are once again provided with the same reference symbols and are not described again. The LC oscillator has been omitted, however, in FIG. 3, for the sake of clarity.

Figure 4:
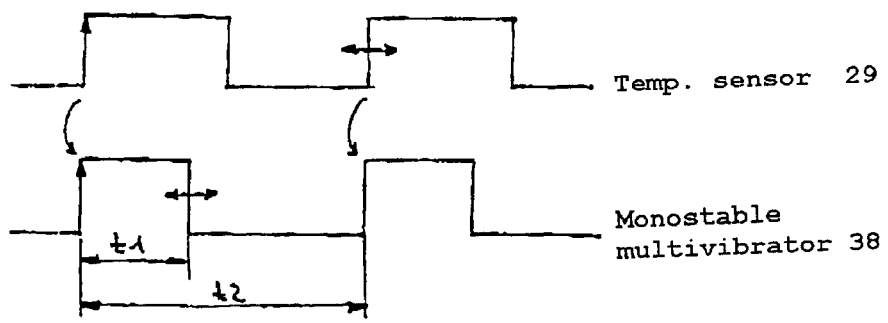
FIG. 4 shows square-wave signals generated by the circuit according to FIG. 3 and serving for the transmission of a measured temperature and a temperature coefficient from the machining head to the evaluation unit.

A temperature sensor 29 in the form of an integrated circuit is connected between the cathode of the rectifier diode 25 and earth. The energy storage device 28 is connected in parallel with the temperature sensor 29. At an output 37, the temperature sensor 29 yields as output signal a square-wave voltage whose frequency is proportional to the measured temperature. The profile of the square-wave voltage at the output 37 is shown at the top of FIG. 4. In order to be able to transmit a temperature coefficient in addition to the temperature, a monostable multivibrator 38 is used to influence the duty ratio of the output signal of the temperature sensor 29 in such a way that the time t1 or pulse duration which can be set individually for each machining head 4 is proportional to the temperature coefficient. This can be discerned in the bottom part of FIG. 4. The time t2 contains the temperature information or the information about the measured temperature value.

For the voltage supply, the monostable multivibrator 38 is on the one hand connected to the cathode of the rectifier diode 25 and is on the other hand earthed via a variable resistor 39. The variable resistor 39 can alter the time t1, that is to say the temperature coefficient provided for the respective machining head 4, so that the resistor 39 can be regarded as a storage device for the temperature coefficient. The output of the monostable multivibrator 38 is connected via a base resistor 40 to the transistor 32, whose emitter is earthed and whose collector is connected via the resistor 31 to the inner conductor 13 of the coaxial cable 3. The DC supply voltage is thus loaded in time with the output signal of the monostable multivibrator 38 (FIG. 4, bottom), so that corresponding current fluctuations can be measured by the evaluation unit 2 in the manner already described. In other words, the output signal of the monostable multivibrator 38 (FIG. 4, bottom) can be reproduced by the evaluation unit 2, so that the microprocessor 16 can determine the times t1 and t2, for instance by counting, and thus the temperature coefficient (time t1) and also the measured temperature (time t2). Temperature compensation can then also be performed again in the manner already described, by the count of the frequency counter 15 being correspondingly corrected.

What is claimed is:

1. Method for temperature compensation of an LC oscillator (8) having a machining head (4) and serving for the capacitive measurement of a distance between the machining head (4) and a workpiece (7), in which an output signal (S) of the LC oscillator (8) is transmitted to an evaluation unit (2) arranged separately from the machining head (4), characterized in that the temperature (T) of the LC oscillator (8) is measured with the aid of a temperature sensor (29), the temperature (T) is transmitted to the evaluation unit (2), and in the evaluation unit (2), temperature compensation of the output signal (S) of the LC oscillator (8) is effected using the measured temperature (T) and a temperature coefficient (K) assigned to the machining head (4).

2. Method according to claim 1, characterized in that the temperature coefficient (K) is stored in a storage device (30, 39) carried by the machining head (4) and is transmitted to the evaluation unit (2) for the purpose of temperature compensation of the output signal (S) of the LC oscillator (8).

3. Method according to claim 1 or 2, characterized in that the transmission of the measured temperature (T) and/or of the stored temperature coefficient (K) to the evaluation unit (2) is effected digitally.

4. Method according to one of claim 1, characterized in that at least the output signal (S) of the LC oscillator (8) and the measured temperature (T), and if appropriate the temperature coefficient (K) as well, are transmitted to the evaluation unit (2) via the same line (3).

5. Method according to claim 3, characterized in that the transmission of the measured temperature (T) and/or of the temperature coefficient (K) is effected digitally in a different frequency range from that of the output signal (S) of the LC oscillator (8).

6. Method according to one of claim 3, characterized in that the digitization is effected by modulation of the current demand of a circuit (1) which is present in a manner pertaining to the machining head and contains at least the temperature sensor (29), and in that the modulated current demand is monitored in the evaluation unit (2).

7. Method according to one of claim 3, characterized in that a serial bit stream is used as data format of the digital transmission.

8. Method according to one of claim 3, characterized in that, for the digital transmission, a square-wave voltage is used whose frequency is proportional to the measured temperature (T) and whose pulse duration (t1) is proportional to the temperature coefficient (K).

9. Machining head (4) having an LC oscillator (8) formed partly by it and serving for the capacitive measurement of a distance between the machining head (4) and a workpiece (7) to be machined, in which an output signal (S) of the LC oscillator (8) can be transmitted to an evaluation unit (2) separate from the machining head (4), characterized in that it has at least one temperature sensor (29) for measuring the temperature (T) of the LC oscillator (8), and in that the measured temperature (T) can be transmitted to the evaluation unit (2).

10. Machining head according to claim 9, characterized in that it has a storage device (30, 39) for storing a temperature coefficient (K) which is provided for it and can be transmitted to the evaluation unit (2).

11. Machining head according to claim 9 or 10, characterized in that it has a circuit (26, 31, 32; 38, 39, 31, 32) for digitizing the measured temperature (T) and/or the temperature coefficient (K).

12. Machining head according to claim 11, characterized in that the digitization circuit can be supplied via a cable (3) with a supply voltage ($U_B$) from the evaluation unit (2) and the digitization is effected by modulation of its current demand.

13. Machining head according to claim 12, characterized in that the modulation of the current demand can be carried out by connecting a resistor (31) to the supply voltage ($U_B$).

14. Machining head according to one of claim 9, characterized in that it can be connected to the evaluation unit (2) via a coaxial cable (3), via whose inner conductor (13) the output signal (S) of the LC oscillator (8), the measured temperature (T) and, if appropriate, the temperature coefficient (K) can be transmitted.

15. Machining head according to claim 13, characterized in that a series circuit comprising the resistor (31) and a switch (32) is located between inner conductor (13) and screening conductor (27) of the coaxial cable (3).

16. Machining head according to claim 15, characterized in that the switch (32) can be driven for serial transmission of a bit stream.

17. Machining head according to claim 15, characterized in that the switch (32) can be driven via a monostable multivibrator (38).

18. Machining head according to one of claim 9, characterized in that it is designed as a laser machining head (4).

19. Evaluation unit for a machining head according to one of claim 9, characterized in that it has a current measuring device (22, 34) for measuring the supply current of the machining head (4), and a comparison circuit (35, 36) connected downstream of the current measuring device (22, 34).

20. Evaluation unit according to claim 19, characterized in that the comparison circuit (35, 36) is connected to a microprocessor (16) on the output side, the output signal (S) of the LC oscillator (8) also being fed to the said microprocessor via a high-pass filter (14).

* * * * *